(12) United States Patent
Graham et al.

(10) Patent No.: US 7,099,553 B1
(45) Date of Patent: Aug. 29, 2006

(54) APPARATUS AND METHOD FOR GENERATING A LAMINA OF LIGHT

(75) Inventors: David S. Graham, Mountain View, CA (US); Guolin Ma, Milpitas, CA (US); David A. Schleuning, Oakland, CA (US); Warren Lewis, Sunnyvale, CA (US)

(73) Assignee: Poa Sona, Inc., Mountain View, CA (US)

( * ) Notice: Subject to any disclaimer, the term of this patent is extended or adjusted under 35 U.S.C. 154(b) by 223 days.

(21) Appl. No.: 10/816,639

(22) Filed: Apr. 1, 2004

Related U.S. Application Data

(60) Provisional application No. 60/461,047, filed on Apr. 8, 2003, now abandoned.

(51) Int. Cl.
*G02B 6/00* (2006.01)

(52) U.S. Cl. ....................... 385/146; 345/175

(58) Field of Classification Search ............... None
See application file for complete search history.

(56) References Cited

U.S. PATENT DOCUMENTS

| | | | | |
|---|---|---|---|---|
| 3,584,226 A * | 6/1971 | Lerner ..................... 250/222.1 |
| 4,068,121 A * | 1/1978 | Bringhurst et al. .... 250/227.28 |
| 4,737,626 A * | 4/1988 | Hasegawa .................. 250/221 |
| 4,746,770 A | 5/1988 | McAvinney ............. 178/18.09 |
| 4,776,661 A * | 10/1988 | Handa .......................... 385/37 |
| 5,050,946 A * | 9/1991 | Hathaway et al. ............ 385/33 |
| 5,235,193 A * | 8/1993 | Hurlimann ................... 250/566 |
| 5,414,413 A | 5/1995 | Tamaru et al. .............. 345/175 |
| 5,512,943 A * | 4/1996 | Bahnemann et al. ....... 348/177 |
| 5,668,913 A * | 9/1997 | Tai et al. ..................... 385/146 |
| 5,786,810 A * | 7/1998 | Knox et al. ................. 345/168 |
| 5,914,709 A | 6/1999 | Graham et al. ............. 345/179 |
| 6,181,842 B1 | 1/2001 | Francis et al. ................ 385/14 |
| 6,351,260 B1 | 2/2002 | Graham et al. ............. 345/179 |
| 6,525,677 B1 * | 2/2003 | Printzis ....................... 341/31 |
| 6,734,929 B1 * | 5/2004 | Sugiura et al. ............... 349/65 |

* cited by examiner

*Primary Examiner*—Rodney Bovernick
*Assistant Examiner*—Mike Stahl
(74) *Attorney, Agent, or Firm*—Beyer Weaver & Thomas, LLP

(57) ABSTRACT

An apparatus and method for generating a lamina of light. The apparatus includes an optically transparent member having an input configured to receive light and one or more facets formed in the optically transparent member. As light enters and travels through the member, a lamina of light is created by the light reflecting off the facets. In one application, the lamina of light is provided in the free space adjacent a touch screen display. When the lamina is interrupted during a data entry operation to the screen, an optical position detection device is used to determine the data input based on the location of the interrupt in the lamina. In various other embodiments, the position and uniformity of the lamina may be controlled by selecting the angle, depth and tilt of a reflective surface of the facets in the optically transparent member.

37 Claims, 9 Drawing Sheets

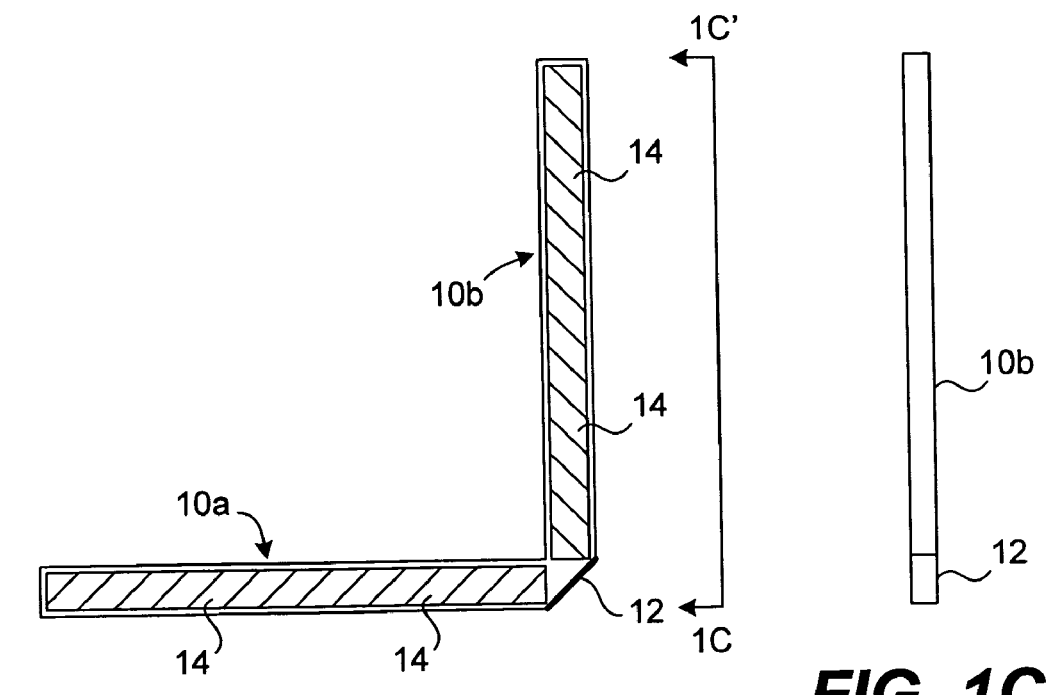
FIG. 1A
FIG. 1C
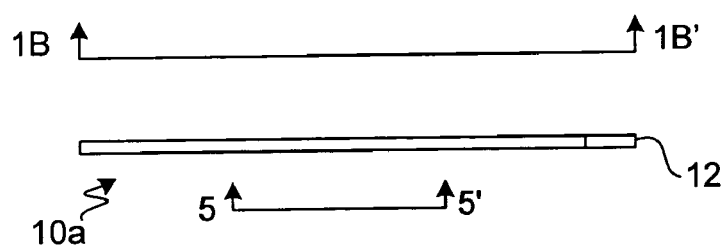
FIG. 1B

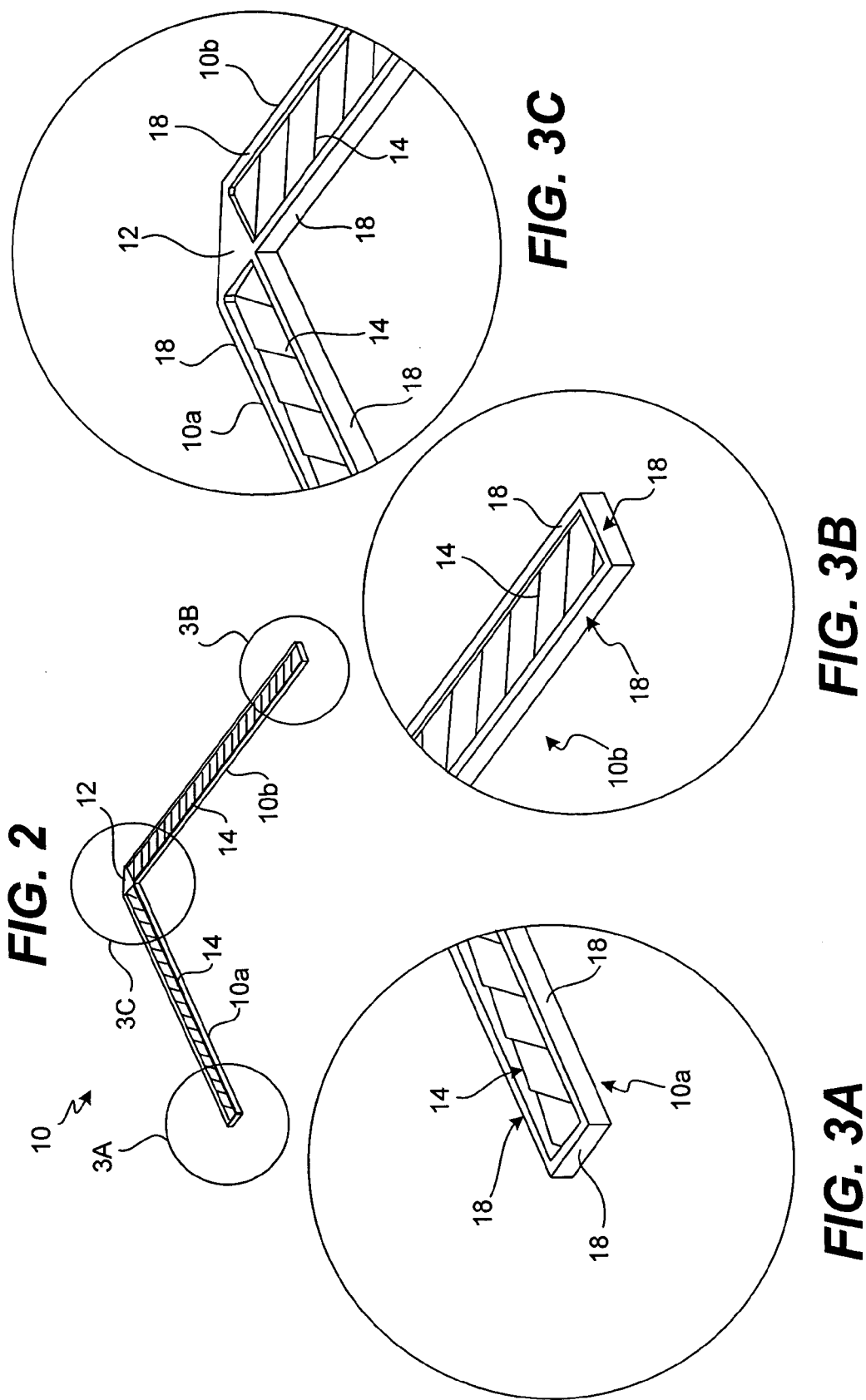

APPARATUS AND METHOD FOR GENERATING A LAMINA OF LIGHT

CROSS REFERENCE TO RELATED APPLICATIONS

This application claims the benefit of priority under 35 U.S.C. § 119(e) to U.S. Provisional Application No. 60/461,047 filed Apr. 8, 2003, now abandoned, entitled L SHAPED TRANSMITTER FOR GRID OF PARALLEL BEAMS OF COLLIMATED LIGHT, which is incorporated herein by reference in its entireties and for all purposes.

BACKGROUND OF THE INVENTION

1. Field of the Invention

The present invention relates generally to light generation for optical sensor devices, and more particularly, to an optically transparent member with internal facets that act like total internal reflection mirrors that generate a lamina of light when light is transmitted through the member.

2. Description of the Related Art

User input devices for data processing systems can take many forms. Two types of relevance are touch screens and pen-based screens. With either a touch screen or a pen-based screen, a user may input data by touching the display screen with either a finger or an input device such as a stylus or pen.

One conventional approach to providing a touch or pen-based input system is to overlay a resistive or capacitive film over the display screen. This approach has a number of problems. Foremost, the film causes the display to appear dim and obscures viewing of the underlying display. To compensate, the intensity of the display screen is often increased. However, in the case of most portable devices, such as cell phones, personal digital assistants, and laptop computers, high intensity screens are usually not provided. If they were available, the added intensity would require additional power, reducing the life of the battery of the device. The films are also easily damaged. In addition, the cost of the film scales dramatically with the size of the screen. With large screens, the cost is therefore typically prohibitive.

Another approach to providing touch or pen-based input systems is to use an array of source Light Emitting Diodes (LEDs) along two adjacent X-Y sides of an input display and a reciprocal array of corresponding photodiodes along the opposite two adjacent X-Y sides of the input display. Each LED generates a light beam directed to the reciprocal photodiode. When the user touches the display, with either a finger or pen, the interruptions in the light beams are detected by the corresponding X and Y photodiodes on the opposite side of the display. The data input is thus determined by calculating the coordinates of the interruptions as detected by the X and Y photodiodes. This type of data input display, however, also has a number of problems. A large number of LEDs and photodiodes are required for a typical data input display. The position of the LEDs and the reciprocal photodiodes also need to be aligned. The relatively large number of LEDs and photodiodes, and the need for precise alignment, make such displays complex, expensive, and difficult to manufacture.

Yet another approach involves the use of polymer waveguides to both generate and receive beams of light from a single light source to a single array detector. These systems tend to be complicated and expensive and require alignment between the transmit and receive waveguides.

Accordingly, there is a need for an optically transparent member with internal facets that act like total internal reflection mirrors to create a lamina of light when light is transmitted through the member.

SUMMARY OF THE INVENTION

The present invention relates to an apparatus and method for generating a lamina of light. The apparatus includes an optically transparent member having an input configured to receive light and one or more facets formed in the optically transparent member. As light enters and travels through the member, a lamina of light is created by the light reflecting off the facets. In one application, the lamina of light is provided in the free space adjacent a touch screen display. When the lamina is interrupted during a data entry operation to the screen, an optical position detection device is used to determine the data input based on the location of the interrupt in the lamina. In various other embodiments, the position and uniformity of the lamina may be controlled by selecting the angle, depth and tilt of a reflective surface of the facets in the optically transparent member.

BRIEF DESCRIPTION OF THE DRAWINGS

The invention, together with further advantages thereof, may best be understood by reference to the following description taken in conjunction with the accompanying drawings in which:

FIGS. 1A–1C are top, front and side views of an optically transparent member with internal facets used to generate parallel beams of light according to the present invention.

FIG. 2 is a perspective view of an optically transparent member with internal facets used generate parallel beams of light according to the present invention.

FIGS. 3A–3C are enlarged views of various features of the optically transparent member according to the present invention.

In the figures, like reference numbers refer to like components and elements.

DETAILED DESCRIPTION OF THE INVENTION

Figure 4:
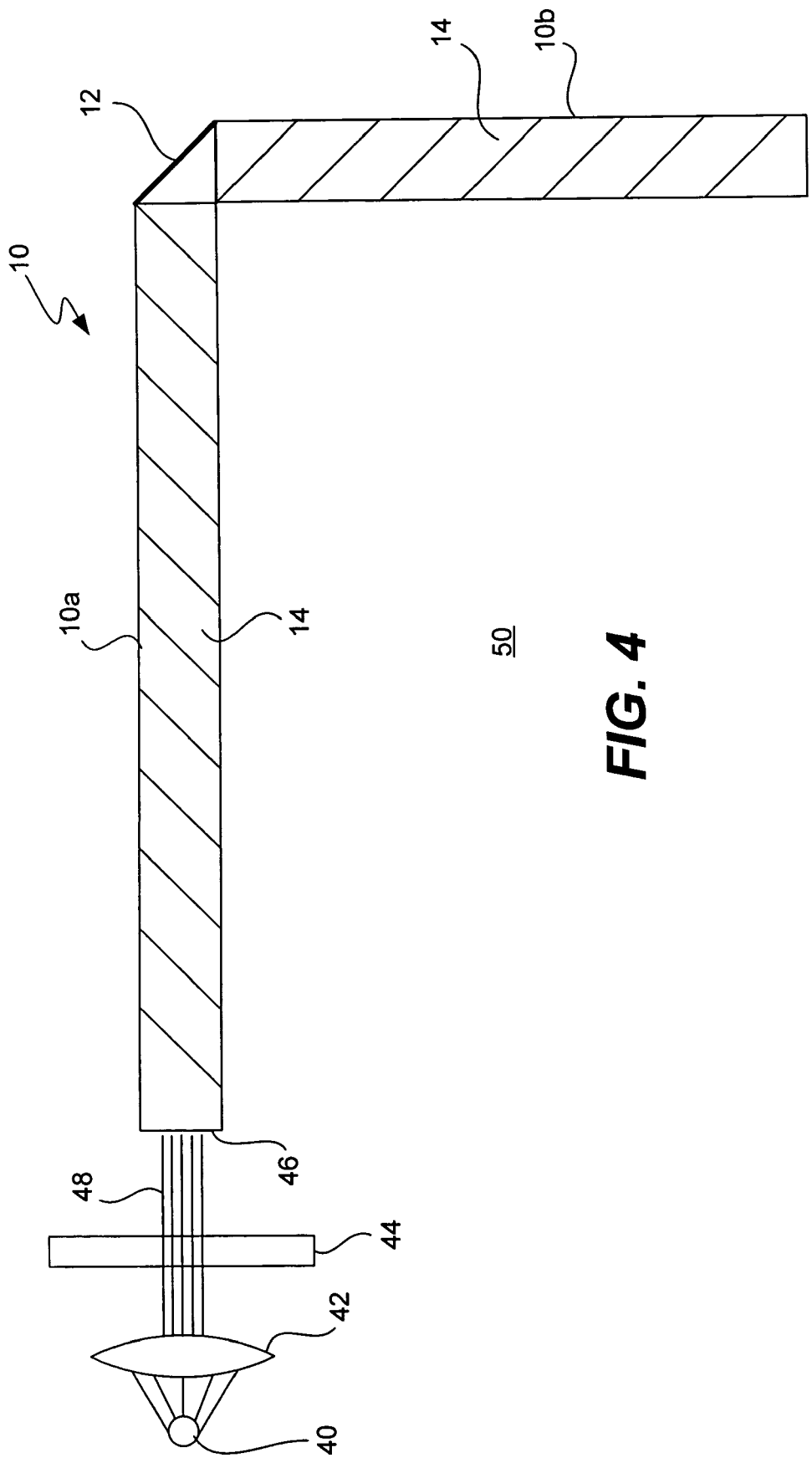
FIG. 4 is a top-down view of the optically transparent member generating a lamina of light according to the present invention.

In co-pending, commonly assigned, U.S. application Ser. No. 10/817,564, filed on the same day as the present application, a data entry apparatus and method is disclosed. The data entry apparatus creates a continuous sheet or lamina of light in the free space adjacent to a touch screen. An optical position detection device, optically coupled to the lamina of light, is provided to detect data entries to the input device by determining the location of inputs in the lamina caused when data is entered to the input device. During operation, a user makes a data entry to the device by touching the screen using an input device, such as a finger, pen or stylus. During the act of touching the screen, the lamina of light in the free space adjacent the screen is interrupted. The optical position detection device detects the position of the input based on the location of the interrupt. Based on the determined position, the data entry is determined. The aforementioned patent application is incorporated by reference herein for all purposes.

Referring to FIGS. 1A–1C, top and side views of an optically transparent member with internal facets used to generate a lamina of light according to the present invention is shown. The member 10 includes, in this particular embodiment, two sides 10a and 10b. The two sides 10a and 10b are joined at an angle 12. Each side 10a and 10b includes a plurality of facets 14. FIGS. 1B and 1C show side views of the member 10 along axis B–B' and C–C' respectively.

The member 10 is made of an optically transparent material, such as plastic or glass, according to various embodiments of the invention. Whatever material choice is used, the material should have an index of refraction greater than that of the free space surrounding the member 10. For example, if a member 10 is made of plastic, it will have an index of refraction of 1.5. Since the material in this instance has an index of refraction greater than the surrounding air (i.e., air has an index of refraction of n=1.0), the angle 12 and the facets 14 act as Total Internal Reflection (TIR) mirrors. Consequently, when light is transmitted through the member 10, beams are reflected off the "mirrors", creating a lamina of light.

Referring to FIG. 2, a perspective view of the optically transparent member 10 is shown. The two sides 10a and 10b of the member 10 are joined at angle 12. Both sides 10a and 10b include facets 14.

Referring to FIGS. 3A–3C, enlarged views of various features of the optically transparent member according to the present invention are shown. In FIG. 3A, the facets 14 are shown recessed within the side walls 18 of the member 10. Similarly, in FIG. 3B, the facets 14 are shown recessed within the side walls 18 of the side 10b. FIG. 3C shows the two sides 10a and 10b of member 10 joined by angle 12. Again, the facets 14 are shown recessed within the side walls 18 of the member 10. The sidewalls 18 are provided to keep any rough edges that may result from the manufacture (e.g., molding or cutting) along the edge surfaces of the optically transparent member 10 out of the optical path.

Referring to FIG. 4, a diagram of the optically transparent member 10 during operation is shown. A light source 40, collimating element 42, and a diffusing element 44 are all positioned adjacent a first end 46 of the member 10. In one embodiment, the light source 40 is a Vertical Cavity Surface Emitting laser (VCSEL), the collimating element is a lens, and the diffusing element 44 is a plastic with small plastic or glass dispersive spheres. The collimating element 42 receives light from the light source 40. The resulting collimated light 48 is directed through the diffusing element 44 and into a light input end 46 of the member 10. The light beams 48 are scattered by the diffusing element for the purpose of slightly destroying the focus of the collimating element 42, making the system "a-focal". An a-focal system tends to create a more uniform dispersal of light when traveling down the optically transparent member 10. In one embodiment, the diffusing element introduces only a slight scattering effect, for example, an average divergence of one (1) degree. In other embodiments, the scattering effect ranges from 10 degrees or less. The scattered light entering the input end 46 travels down the length of side 10a, is reflected by the angled mirror 12, which operates by TIR, and then travels down the side 10b. As the light travels through the member 10, light is reflected off the mirrored surfaces of the facets 14, resulting in the light being reflected into the free space between the sides 10a and 10b. The reflected light creates, in effect, a lamina 50 of light in the free space between the sides 10a and 10b of the member 10.

Figure 5:
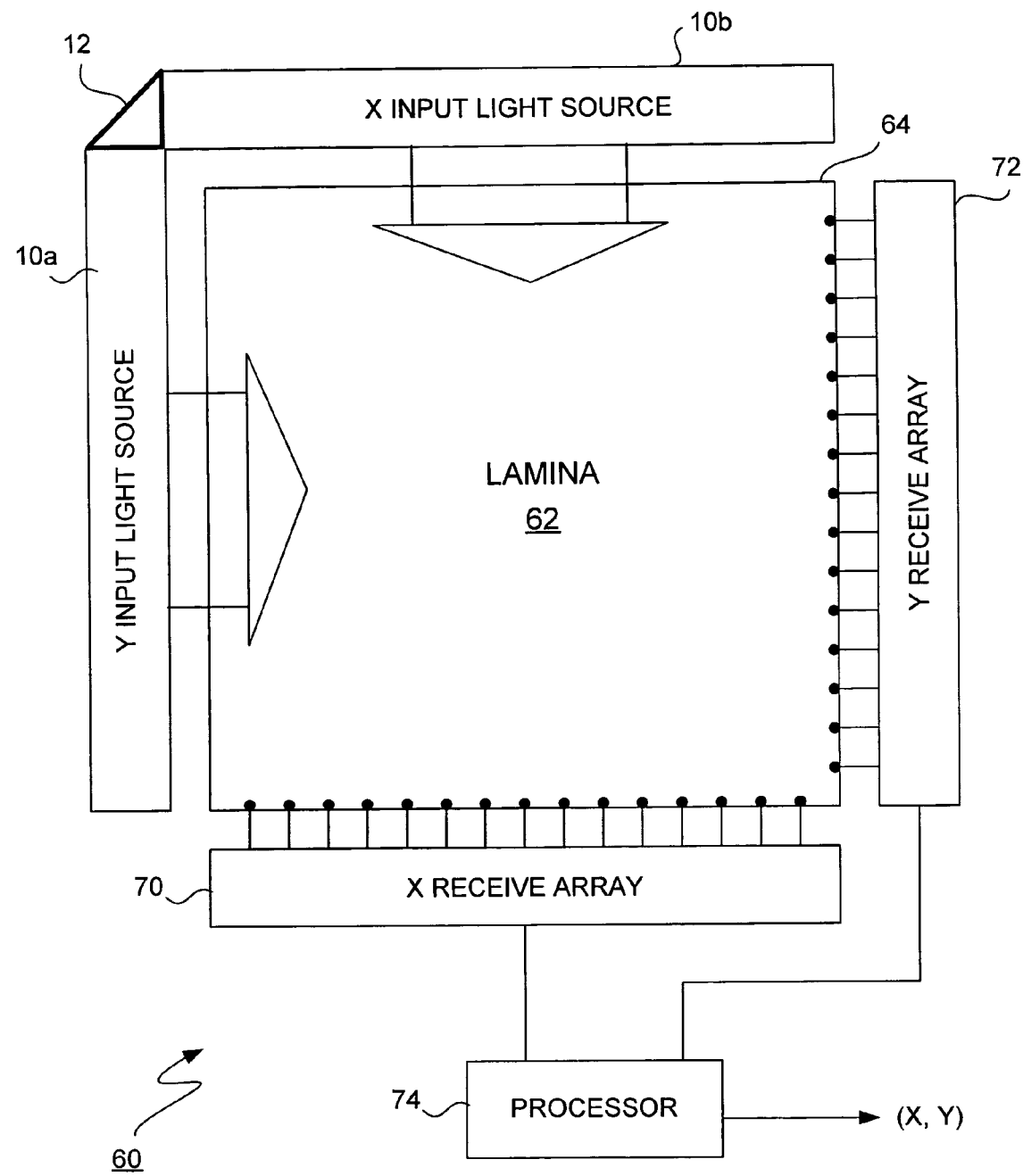
FIG. 5 is a diagram of the optically transparent member used for generating a lamina of light in a data input device according to one embodiment of the present invention.

Referring to FIG. 5, the use of member 10 in a touch screen display system according to one embodiment of the present invention is shown. The touch screen display system 60 includes a lamina 62 of light generated in the free space adjacent to or just above a display screen 64. The lamina 62 is generated by the member 10 configured to propagate light across the free space immediately above the surface of the screen. Specifically, side 10a is used to generate light in the Y direction and side 10b is used to generate light in the X direction. The resulting lamina 62 of light is created in the free space just above or in front of the screen 64. The lamina 62 is thus interrupted when an input device (not shown), such as a user's finger or a hand-held stylus or pen, is used to touch the screen 64 during a data entry operation. An X axis light receiving array 70 and a Y axis light receiving array 72 are positioned on the two opposing sides of the screen 64, opposite the sides 10b and 10a respectively. The light receiving arrays 70 and 72 detect the X axis and Y axis coordinates of any shadow in the lamina 62, caused by an input device breaking the lamina 62 in the free space above the screen 74 during a data entry operation. A processor 74, coupled to the X axis and Y axis arrays 70 and 72, is used to calculate the X axis and Y axis coordinates of the interrupt. Together, the X and Y axis arrays 70 and 72 and the processor 74 provide an optical position detection device for detecting the position of interrupts in the grid 62. Based on the coordinates of the interrupt, a data entry on the screen 74 can be determined. For more details on this embodiment, see the aforementioned application.

According to various embodiments of the invention, the light reflecting off the facets 14 can be controlled in a number of ways. For example, the angle, tilt, size, depth and curvature of the facets 14 within the member 10 can all be selectively modified to realize a desired result.

Figure 6:
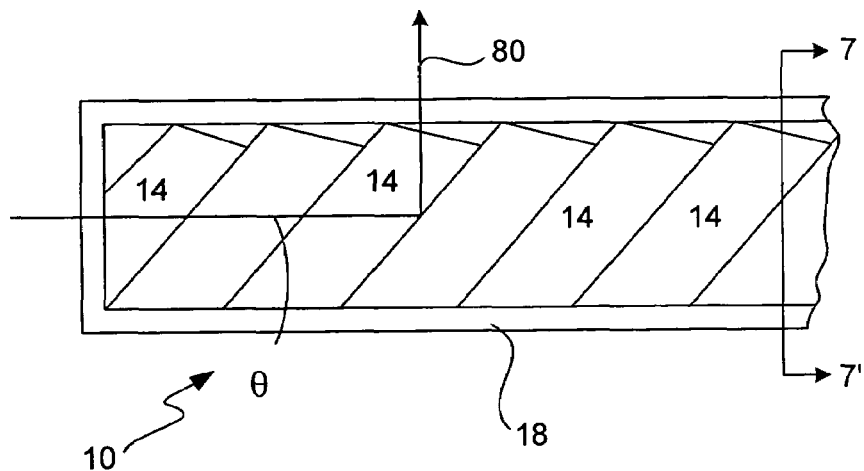
FIG. 6 is a top-down view of a plurality of facets of the optically transparent member of the present invention.

Referring to FIG. 6, an enlarged view of the facets 14 of member 10 are shown. The angle of the facets 14 determine the direction of the reflected light. In the embodiment shown, the facets 14 are at an angle of approximately forty-five degrees ($\theta=45$ degrees) with respect to the side walls 18 of member 10. The reflected light 82 is therefore at an angle of approximately 90 degrees with respect to the member 10. In other embodiments, the angle $\theta$ may vary to control the direction of the reflected light. The angle $\theta$ of the facets 14 may vary from zero to any angle within the TIR of the material used for the optically transparent member. For example, if the material is plastic with n=1.50, the TIR occurs at any angle less than 48 degrees.

Figure 7:
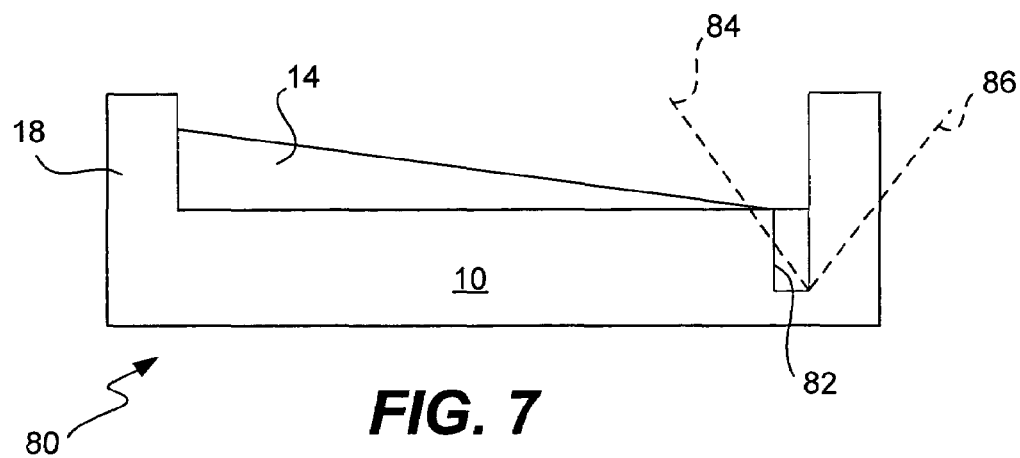
FIG. 7 illustrates a cross section of a facet in the optically transparent member according to one embodiment of the present invention.

Referring to FIG. 7, an enlarged cross section of the member 10 is shown. The cross section 80 illustrates the facet 14 recessed within the side walls 18 of the member 10. The cross section also shows the mirrored or reflective surface 82 of the facet 14. By controlling the tilt of the reflective surface 82, the direction of the light beams can be controlled. For example, if the reflected surface is tilted inward as represented by dashed line 84, then the light reflected off the reflective surface 82 will be steered downward or closer to the area above the member 10. On the other hand, if the reflective surface 82 is tilted in the other direction, as represented by dashed line 86, then the then the light reflected off the reflective surface 82 will be steered upward or higher with respect to the member 10. Hence, by adjusting the tilt of the mirrored surface 82 of the facets 14, the position of the resulting lamina with respect to the member 10 can be controlled.

Figure 8A:
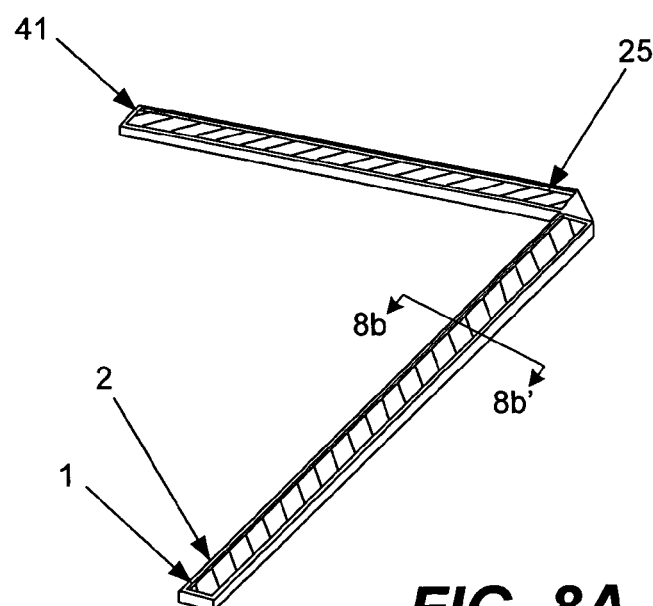
FIGS. 8A and 8B are another perspective view and cross section of the optically transparent member according to the present invention.
Figure 8B:
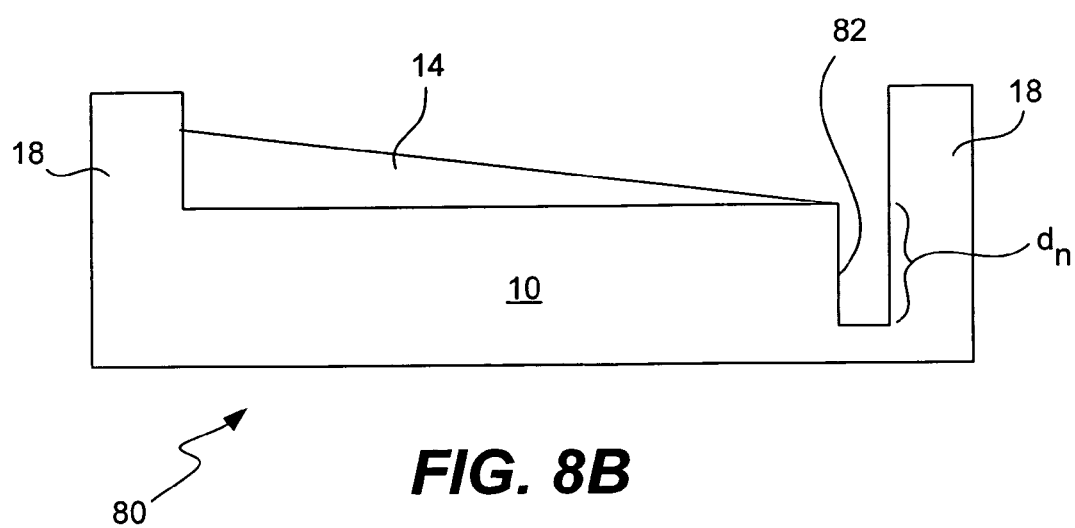

Referring to FIGS. 8A and 8B, a perspective view and cross section of the optically transparent member 10 are shown. As illustrated, the Figure shows the facets 14 sequentially numbered from one (1) through forty one (41). FIG. 8b illustrates a cross section of the member 10 at line 8b–8b' of FIG. 8A. The cross section 80 illustrates the facet 14 recessed within the side walls 18 of the member 10. The cross section also shows the mirrored or reflective surface 82 of the facet 14. By controlling the depth "d" of the reflective surface 82 of each of the facets 14, the direction of the reflected light beams can be controlled. More specifically, the depth of each reflective surface is determined by the equation $$d_n = 1.875 \times 10^{-4}(n-1)2 + 0.030 \text{ mm (where n is the number of the facet)}$$

For example, the depth (d) of the reflective surface 82 for the first (1), eighteenth (18) and thirtieth (30) facets 14 are 0.030, 0.084 and 0.188 mm respectively. By altering the depth of each reflective surface 82, each facet 14 receives substantially the same amount of light. The resulting lamina is therefore substantially uniform.

The divergence of light emitted from the optically transparent member can be controlled by the height of the reflective surface 82. For example, the smaller the height of the reflective surface, the broader or larger the divergence (i.e., same principle as a "single slit" diffraction) and vice versa.

Figure 9A:
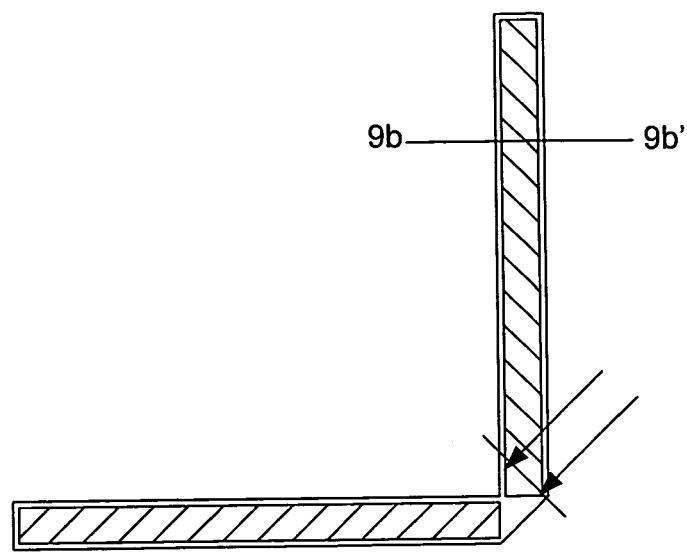
FIGS. 9A and 9B are another top view and cross section of the optically transparent member according to the present invention.
Figure 9B:
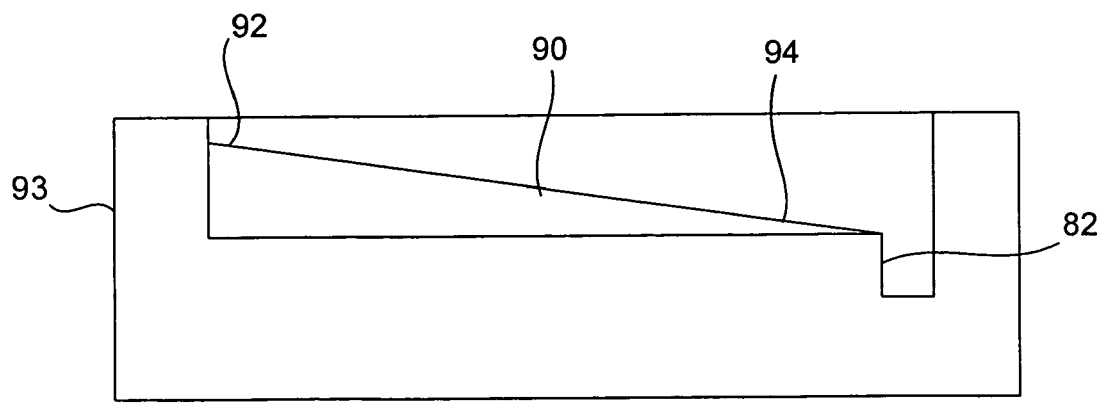

Referring to FIGS. 9A and 9B, another perspective view and cross section of the member 10 is shown. In FIG. 9B, a cross section of the facet 14 along line 9b–9b'. The top surface 90 of the facet 14 is characterized by being taller in the vicinity 92 of the light emitting surface 93 and being shorter in the vicinity 94 of the reflective surface 82. The height profile prevents the top surface of the facet 14 from blocking the light from the next facet 14.

In a low cost embodiment of the present invention, the member 10 is made from a molded piece of plastic. In other embodiments, the member can be made from a machined or cut piece of glass or plastic.

Figure 10A:
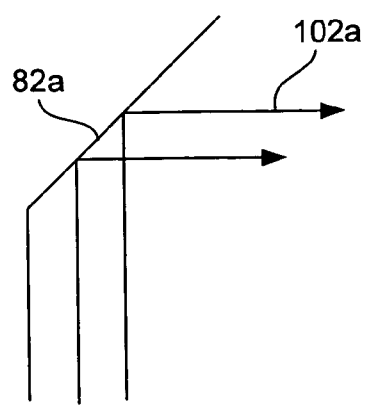
FIGS. 10A through 10C illustrate different shapes of reflective surfaces used in the optically transparent member according to the present invention.
Figure 10B:
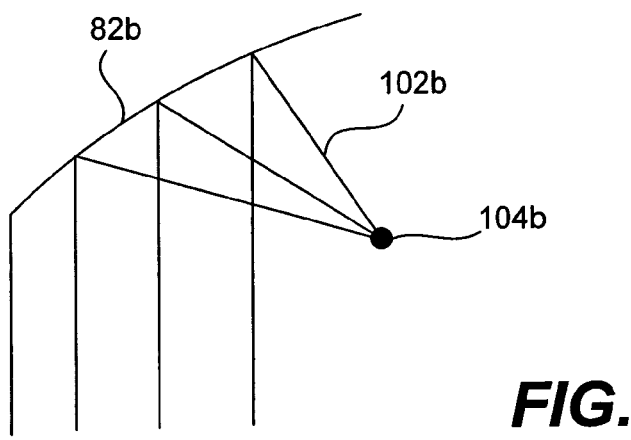
Figure 10C:
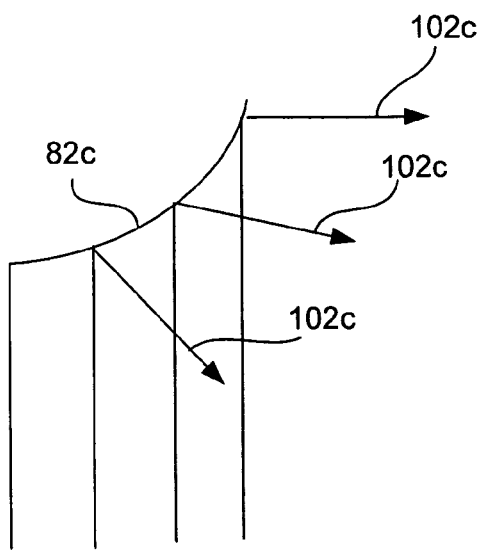

In various embodiments of the invention, the shape or curvature of the reflective surface 82 of the facets 14 of member 10 can also be altered to achieve a desired optical result. For example, in FIG. 10A, the reflective surface 82a is flat and at a 45 degree angle with regard to the side walls 18 (not shown) of the member 10. Consequently, the reflected light, represented by arrows 102a, are at 90 degrees. In FIG. 10B, the reflective surface 82b is shaped as a converging reflector. As a result, the reflected light beams 102b converge at a focal point 104b. Finally, as illustrated in FIG. 10C, the reflective surface 82c is shaped as a diverging reflector. The reflected light beams 102c therefore diverge in different directions. In other embodiments, other reflective surfaces of member 10 (e.g. the top, side or bottom surfaces of the member 10) may be designed to reflect the portion of the light striking such surfaces in a desired direction or manner. Additionally, end surfaces, such as the ends of reflective surfaces 82 may be designed in a manner (e.g. curved or further angled) to direct the corresponding incident portion of the light striking such surfaces in a desired manner. Thus, it should be appreciated that virtually any surface of the member 10 may be made reflective and oriented in a manner that directs the light. It should also be appreciated that the light may be reflected in a direction that falls within the plane of the member 10 or at an angle with that plane.

In still other embodiments, any surface of the member 10 that light passes into our out of may be curved or otherwise oriented in a manner that refracts the light in a desired direction. This can include the light receiving end of member 10, or any surface that light is arranged to pass out of. (e.g. the inner side wall, the top wall, the bottom wall, an end wall, etc. of the member 10).

Figure 11:
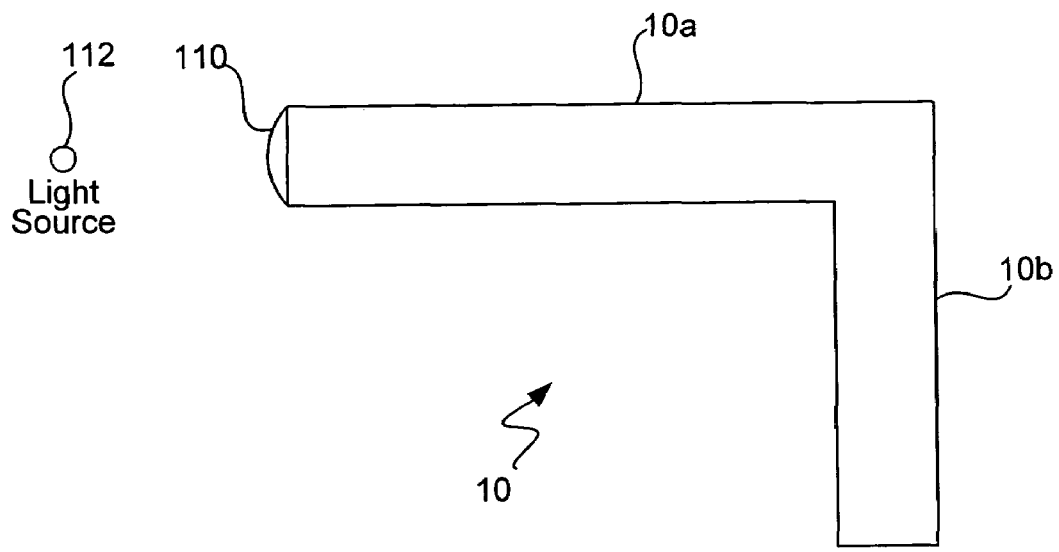
FIG. 11 illustrates another embodiment of the optically transparent member according to the present invention.

Referring next to FIG. 11, one particular embodiment of the optically transparent member that incorporates a refracting surface is shown. In this embodiment, a collimating element 110 is shown integral with the light receiving end of the optically transparent member 10. The collimating element 110 collimates the light from source 112 before it enters the input end of the optically transparent member 10. In various alternatives of this embodiment, the collimating element 110 can be integrally molded or cut from the same piece of plastic or glass used to make the member 10.

Figure 12:
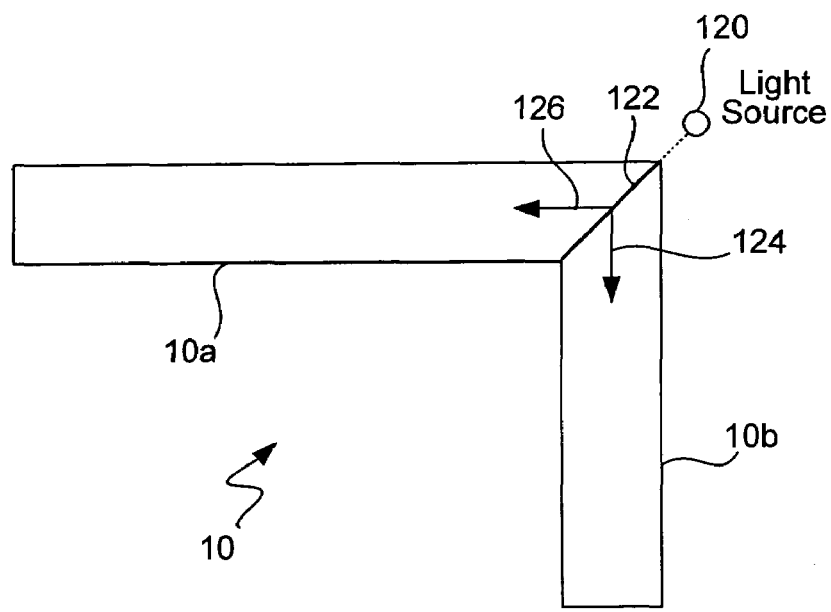
FIG. 12 illustrates yet another embodiment of the optically transparent member according to the present invention.

Referring to FIG. 12, yet another embodiment of the optically transparent member according to the present invention is shown. In this embodiment, a beam splitter 122 is provided at the angle between the sides 10a and 10b of optically transparent member 10. The beam splitter splits the light from light source 122 and directs the light down each side 10a and 10b.

Although the foregoing invention has been described in some detail for purposes of clarity of understanding, it will be apparent that certain changes and modifications may be practiced within the scope of the appended claims. For example, the present invention has been described with use with a two dimensional member 10. In alternative embodiments, the member 10 can be one dimensional, or more than two dimensions, for example three or more dimensions. The member 10 also can assume any shape (e.g., straight, curved, round, etc) and is not necessarily limited to L-shaped as described herein. can be used with either a one dimensional lamina plane (i.e., a line) or even a three dimensional lamina space (X axis, Y axis and Z axis). In any case, the number of light sources and light receiving arrays is generally, but not necessarily, the same as the number of axis used in the system. For example, in the two dimensional lamina 12 illustrated in FIG. 1, X axis and Y axis light sources 16 and 18 are used. However, in alternative embodiments, a single axis light source could be used to create the lamina. In yet other embodiments, either internal or external reflective surfaces (e.g., micro-mirrors) an be used in place of TIR. In various embodiments, the micro-mirrors can be flat, convergent, or divergent. Lenses or some other type of refractive element also can be placed on the light emitting surface of the side walls of the optically transparent member 10. In various embodiments, the refractive elements can be flat, convergent, or divergent. Therefore, the described embodiments should be taken as illustrative and not restrictive, and the invention should not be limited to the details given herein but should be defined by the following claims and their full scope of equivalents.

We claim:

1. An apparatus, comprising;
    an optically transparent member, the optically transparent member having:
        an input configured to receive light; and
        one or more facets formed in the optically transparent member, the one or more facets being configured to reflect light received at the input of the optically transparent member, the reflected light creating a lamina of light adjacent the optically transparent member,
        wherein the one or more facets have an optically reflective surface, and
        wherein the one or more facets have a surface that extends from the optically reflective surface to a light emitting surface on the optically transparent member, the height of the surface varying to reduce the amount of light blocked by first facet and received by a subsequent facet.

2. The apparatus of claim 1, wherein the facets as Total Internal Reflection (TIR) mirrors.

3. The apparatus of claim 1, wherein the optically transparent member is made of a material having an index of refraction greater than the index of refraction of the free space surrounding the optically transparent member when the optically transparent member is in use.

4. The apparatus of claim 1, wherein the optically transparent member has side walls, and the one or more facets being recessed within the side walls.

5. The apparatus of claim 1, wherein the optically transparent member has a first side and a second side, the first side and the second side being joined at a second predetermined angle with respect to one another.

6. The apparatus of claim 5, wherein the first side and the second side are configured at right angles with respect to one another.

7. The of claim 1, wherein the optically transparent member has a first side and a second side joined at an angle, the first side being configured to transmit light received at the input to the second side by way of a Total Internal Reflection mirror formed at the angle.

8. The apparatus of claim 1, further comprising a light source configured to generate the light received at the input of the optically transparent member.

9. The apparatus of claim 8, wherein the light source comprises one of the following types of light sources a laser, LED, or a lamp.

10. The apparatus of claim 8, further comprising a collimating element to collimate the light from the light source before the light enters the input of the optically transparent member.

11. The apparatus of claim 8, further comprising a diffusing element to diffuse the light from the light source before the light enters the input of the optically transparent member.

12. The apparatus of claim 11, wherein the diffusing element diffuses the light in the range of 10 degrees or less.

13. The apparatus of claim 1, further comprising a touch screen display, the display being positioned in the free space next to the lamina of light adjacent the optically transparent member.

14. The apparatus of claim 13, further comprising an optical position detection device configured to detect the position of an interrupt in the lamina when a data entry is made to the touch screen display.

15. The apparatus of claim 13, wherein the optically transparent member has a first side configured to generate the lamina of in a first direction defined by a first axis and a second side configured to generate the lamina of light in a second direction defined by a second axis.

16. The apparatus of claim 14, further comprising a processor, coupled to the optical position detection device, and configured to determine the data entry made to the touch screen display based on the location of the interrupt.

17. The apparatus of claim 1, wherein the one or more facts are configured within the optically transparent member at a predetermined angle with respect to a side wall of the optically transparent member.

18. The apparatus of claim 17, wherein the predetermined angle ranges from zero to any angle within the TIR range of the material used to make the optically transparent member.

19. The apparatus of claim 1, wherein the one or more facets are configured to have a tilt with respect to the optically transparent member, the tilt being selected to steer the direction of the light reflected from the one or more facets respectively.

20. The apparatus of claim 1, wherein the reflective surfaces of the one or more facets each have a different depth.

21. The apparatus of claim 1, wherein the height of the surface is lower in the vicinity of the optically reflective surface relative to the height of the surface near the light emitting surface.

22. The apparatus of claim 1, wherein the optically transparent member is made from an molded piece of glass or plastic.

23. The apparatus of claim 1, wherein the optically transparent member is made from a cut piece of glass or plastic.

24. The apparatus of claim 1, wherein the optically transparent member is made from a machine cut of glass or plastic.

25. The apparatus of claim 1, wherein the optically reflective surface of the one or more facets has one of the following shapes: flat, converging, or diverging.

26. The apparatus of claim 1, further comprising a collimating element integral with the input of the optically transparent member.

27. The apparatus of claim 1, wherein the optically transparent member further comprises a beam splitter configured to split the light received at the input into two directions.

28. The apparatus of claim 1, wherein the optically transparent member has a first side running in the direction of a first axis and a second side in the direction of a second axis.

29. The apparatus of claim 1, further comprising:
a touch display screen, the display screen positioned adjacent the lamina of light created by the optically transparent member;
a receiving array configured to detect an interrupt in the lamina when a data entry is being made in to the touch display screen; and
a processor, coupled to the receiving array, and configured to determine the data entry based on the location of the interrupt in the lamina.

30. The apparatus of claim 29, wherein the receiving array is further configured to detect the coordinates of the interrupt in the lamina along a first axis and a second axis.

31. The apparatus of claim 1, wherein the optically reflective surface of the one or more facets are micromirrors.

32. The apparatus of claim 31, wherein the micro-mirrors are internal to the optically transparent member.

33. The apparatus of claim 31 wherein the micro-mirrors are positioned on an external surface of the optically transparent member.

34. The apparatus of claim 31, wherein the micro-mirrors have one of the follow shapes: flat convergent, or divergent.

35. The apparatus of claim 1, comprising one or more refractive element positioned on an external light emitting surface of the optically transparent member.

36. The apparatus of claim 35, wherein the refractive elements have one of the following shapes: flat, convergent, or divergent.

37. The apparatus of claim 35, wherein the one or more refractive elements correspond to the one or more facets respectively.

* * * * *